June 14, 1938.   B. H. URSCHEL   2,120,584
TEMPERING MACHINE
Filed Feb. 28, 1936   4 Sheets-Sheet 3
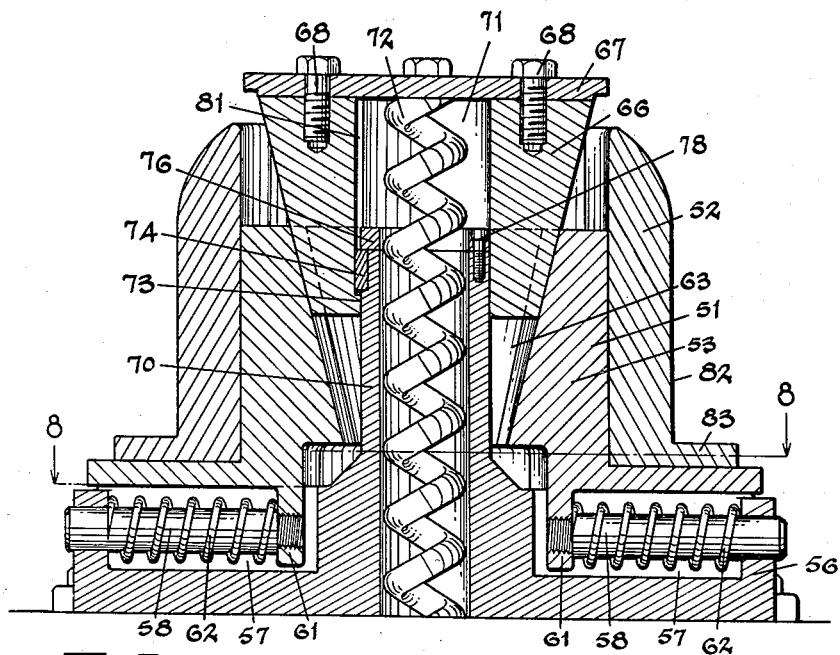
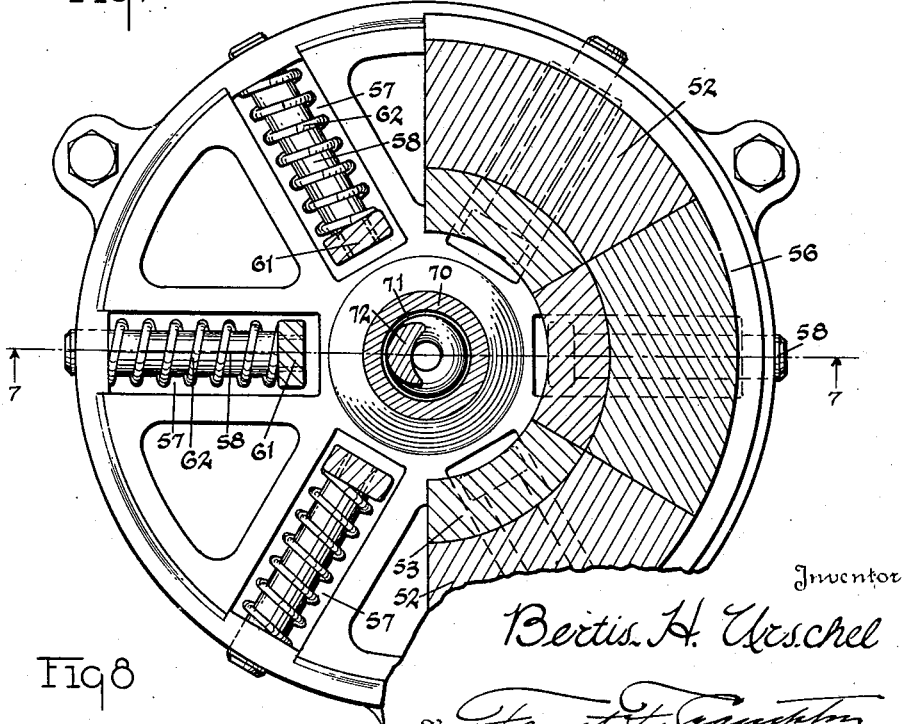

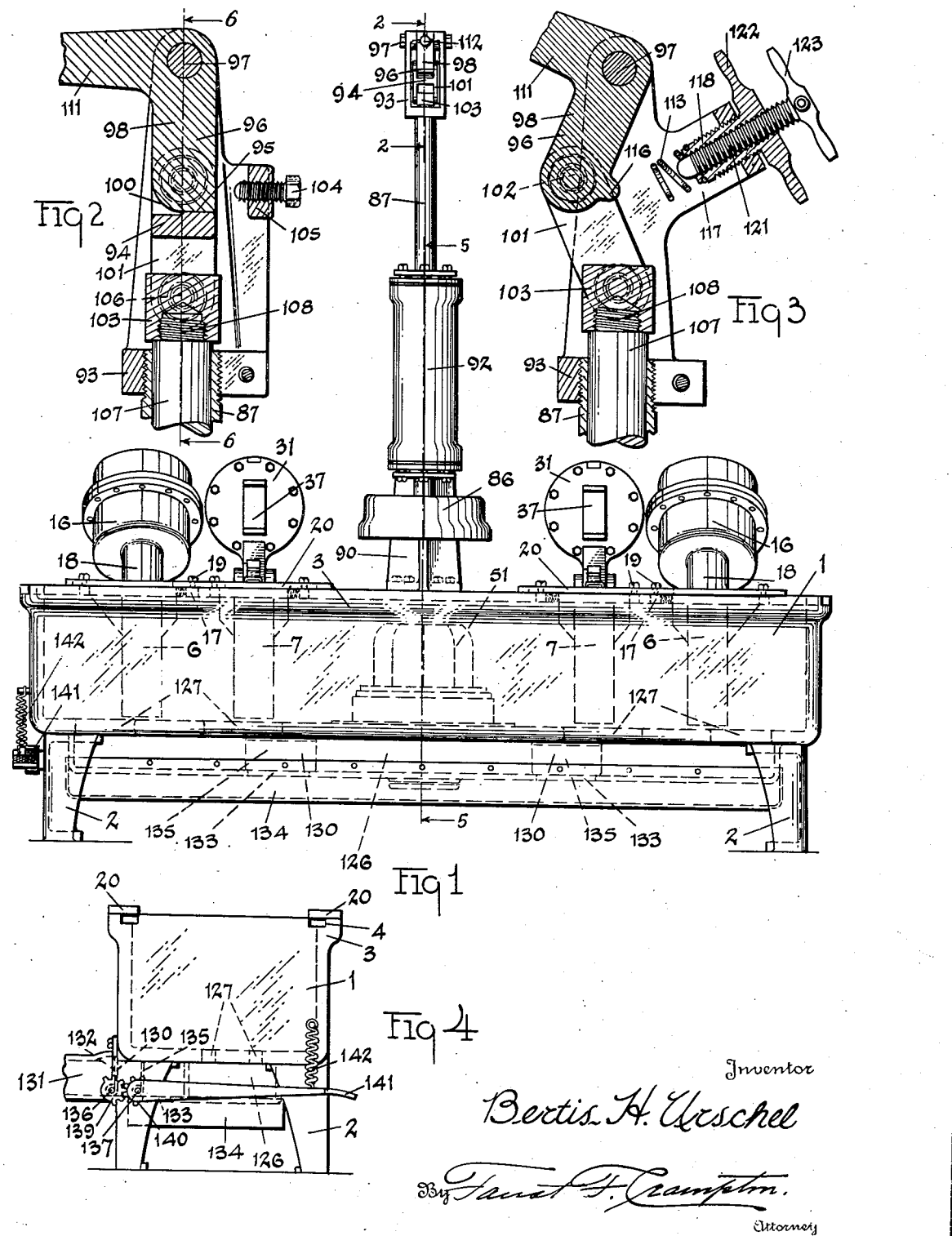

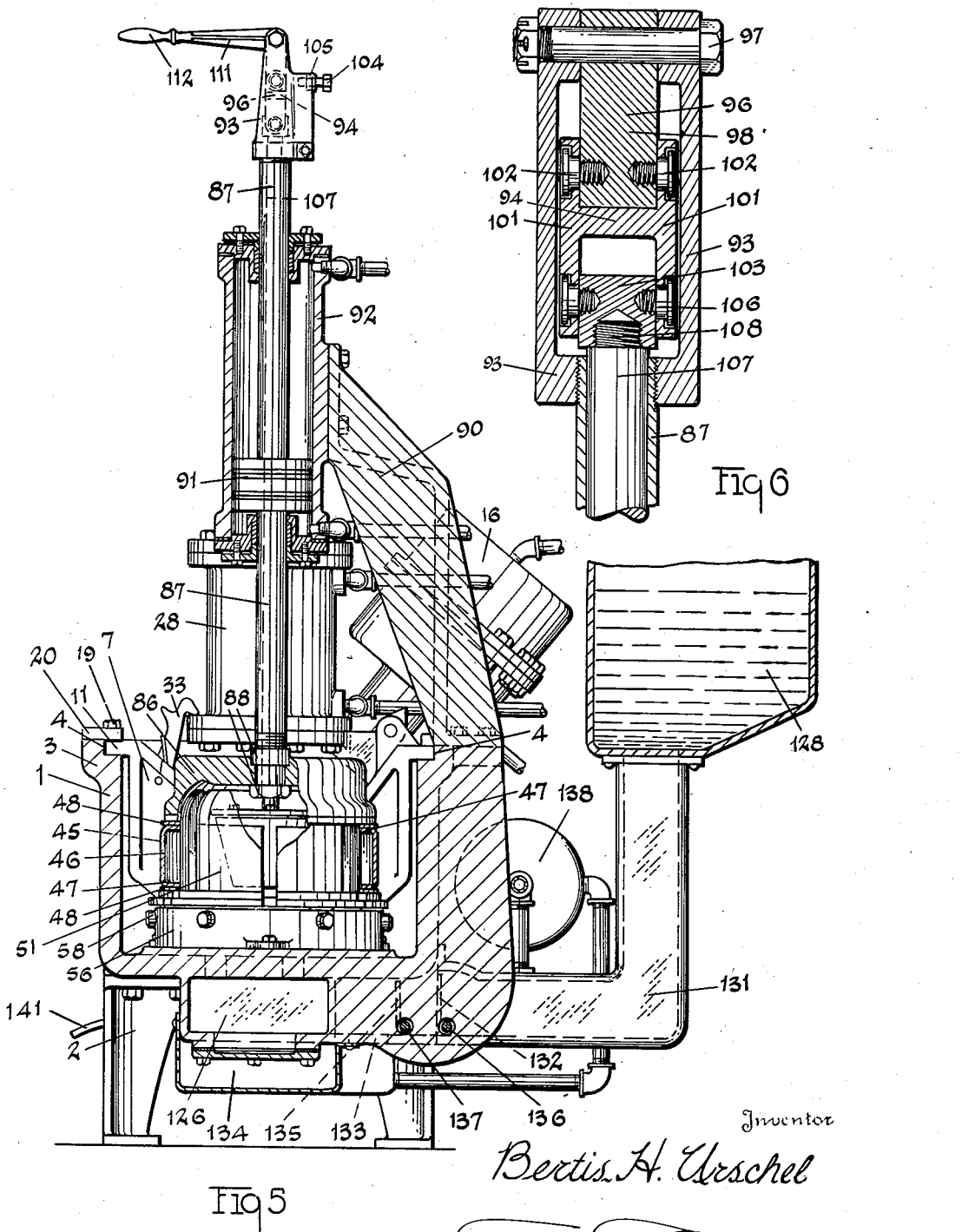

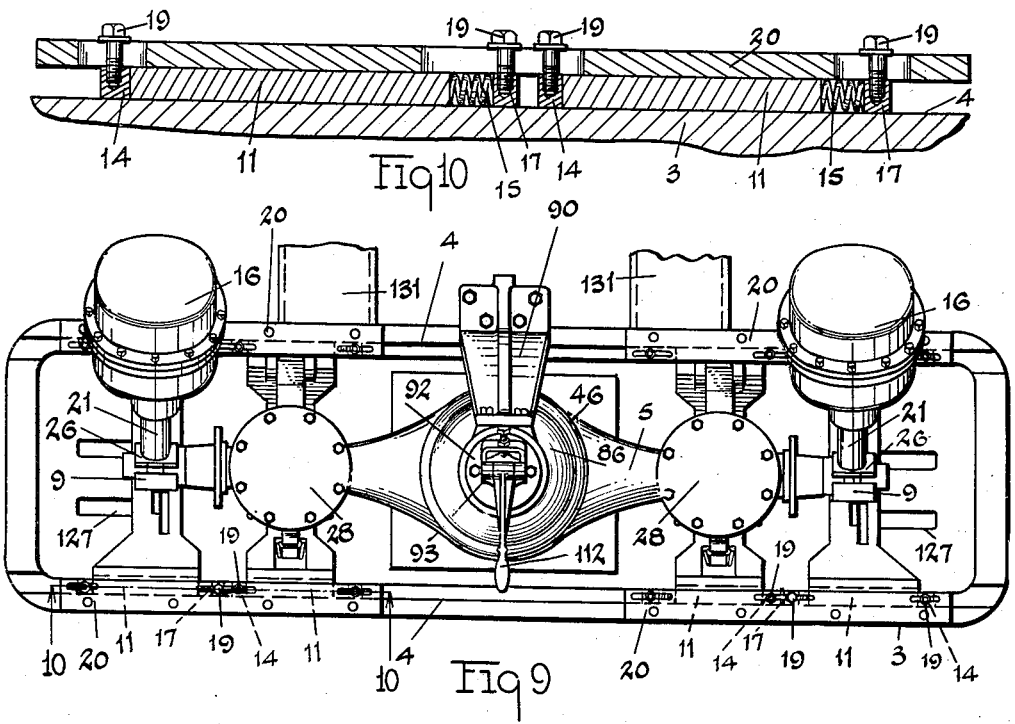

Patented June 14, 1938

2,120,584

UNITED STATES PATENT OFFICE 2,120,584

TEMPERING MACHINE

Bertis H. Urschel, Bowling Green, Ohio, assignor to The Urschel Engineering Company, Bowling Green, Ohio, a corporation of Ohio Application February 28, 1936, Serial No. 66,313

17 Claims. (Cl. 266—6)

My invention has for its object to provide a tempering machine for shaping and tempering articles formed of steel. The invention provides means for locating parts in predetermined relation to each other and in shaping parts of steel articles in advance of the cooling operation in the tempering of the article.

The invention also has for its object to provide relatively movable engaging members to permit contraction of the parts of the article as it is cooled to a predetermined degree while maintaining the parts in definite predetermined positions and thus prevent distortion of parts, one relative to the other, and produce in the finished article the same exact dimensional relations and locations of the parts.

The invention particularly relates to a machine for tempering axle housings commonly used for rotatably supporting the driving wheels of motor driven vehicles.

The invention provides a plurality of engaging members for engaging portions of the differential gear housing part to produce fixed diametric dimensions of the housing and to clamp it in position with reference to the axis of the axle housing and the points of connection of the axle housing to the vehicle, such as the spring pads, or bearing parts, or such other parts as may be desired.

The invention consists of other features which will appear from the following description and upon examination of the drawings. Structures containing my invention may partake of different forms and may be varied in their details and still embody the invention. To illustrate a practical application of the invention, I have selected a tempering machine as an example of the various structures that contain the invention and shall describe the selected structure hereinafter, it being understood that certain features of my invention may be used to advantage without a corresponding use of other features and without departing from the spirit of the invention as presented in the claims. The particular structure selected is shown in the accompanying drawings.

Fig. 1 is a side view of the machine for tempering an axle of the type commonly referred to as the rear axle housing of an automotive vehicle. Fig. 2 is a view of a vertical section of a toggle lever for controlling radial dimensions of the gear housing of the axle taken on the plane of the line 2—2 indicated in Fig. 1. Fig. 3 illustrates a similar section of a modified form of toggle lever. Fig. 4 illustrates an end view of parts of a pair of gate valves for opening and closing the cooling fluid passageways in the machine. Fig. 5 is a view of a vertical section through a part of the machine taken in the plane of the line 5—5 indicated in Fig. 1. Fig. 6 illustrates a vertical section of a part of the toggle means taken on the plane of the line 6—6 indicated in Fig. 2. Fig. 7 illustrates a vertical section of the expanding dies taken on the plane of the line 7—7 indicated in Fig. 8. Fig. 8 is a view of a section taken on the planes of the broken line 8—8 indicated in Fig. 7. Fig. 9 is a top view of the machine. Fig. 10 illustrates a section of the trough taken on the line 10—10 indicated in Fig. 9. Fig. 11 illustrates a clamping means for clamping the spring pads and the parts to which they are connected. Fig. 12 illustrates a part of the clamping means used for clamping the ends of the axle housing.

In the form of tempering machine selected as an example of my invention, a trough or other shaped receptacle 1 is suitably supported on legs 2 and is provided with a flaring ledge 3 extending along upper side edges of the trough. The interior portions of the ledges are cut to form guide-ways 4 in which movable cradles or supporting members 6 and 7 are slidably located. The axle housings 5 are sequentially placed in the supports or cradles and clamped in position preparatory to the tempering operation. The slidable supporting members 6 and 7 have suitable dies 8 and 9 conforming to parts of the axle housing 5. The supporting members 6 and 7 are preferably formed U-shape and are provided with laterally extending flanges 11 that are shaped to substantially fit the guide-ways 4. The members 6 and 7 are of considerable length and may be provided with suitable reinforcing wings 12 and web parts 13 to give stability and strength.

The clamping means for clamping the axle housing are carried by the members 6 and 7 and are movable therewith. The clamping means are preferably pneumatically actuated by means of cylinders connected through suitable valves to a source of supply of air under pressure. Springs 15 are located intermediate the blocks 17 and the flanges 11. The springs press the flanges 11 of the members 6 and 7 against the blocks 14. The blocks 14 and 17 are secured to guide plates 20 by the bolts 19. As the axle housing contracts when cooled, the members 6 and 7 freely slide in the guide-ways 4 and prevent distortion of the cylindricity of the housing. The springs 15 are light-weight springs but have sufficient pressure to return the members to the blocks 14. The springs 15 and the blocks 14 thus dispose the clamping dies in the same position for receiving each heated housing, when the previously chilled housing is released from the members.

The supporting members 6 are provided with the cylinders 16. The cylinders are supported by bosses 18 through which piston rods 21 slidably extend and diagonally move with respect to the trough. The bosses 18 are located near one of the upper corners of each of the slidable members 6 and are operated by air pressure directed from the source of supply of air under pressure to the cylinders 16. The ends of the piston rods 21 are provided with suitable dies 26 having semi-cylindrical recesses 27 and operate to clamp the ends of the axle housing against the dies 9 that also having semi-cylindrical concave recesses located in opposed relation to the recesses 27 formed in the dies 26. By reason of the diagonal movement of the die 26 with reference to the trough and toward the die 9, the parts of the die 9 are formed substantially at right angles in outline. The ends of the housing 5 are thus forced into definite aligned positions relative to each other and to the gear housing.

The spring pads 41 of the axle housing are clamped in position by means of the pneumatic pressure exerted in the cylinders 28 that are secured to hinged plates 31 pivotally connected to the supporting members 7 by the pins 32. The cylinders 28 and the plates 31 are secured in position by the dogs 33 pivotally supported on the members 7 by the pins 34 and are spring-pressed by the springs 36. Suitable dies 37 are supported on the ends of the piston rods 38 and clamp the tops of the spring pads 41 against the dies 8. The dies 8 are provided with recesses 42 having semi-cylindrical surfaces in which the parts of the axle housing located below the pads 41 may be placed. The dies 8 and 37 also locate the parts clamped thereby in definite aligned relation with respect to the axle housing.

The axle housing 5 is provided with a gear housing 45 having a cylindrical part 46. The cylindrical part 46 has open ends. The edges of the open ends are inturned to form the flange parts 47. The gear housing part is placed over a head 51 having a plurality of expanding dies 52. The dies are carried by the expanding elements 53 which are supported upon a base part 56 located on the bottom of the trough 1. The base part 56 is provided with a plurality of recesses 57 in which are located the studs 58 that are threaded into depending lugs 61 extending from the lower sides of the expanding elements 53 into the recesses 57. The expanding elements are slidably supported on the upper surface of the base part 56. Springs 62 are located intermediate the lugs 61 and outer end wall parts of the recesses 57. The springs 62 yieldingly resist outward movements of the elements 53 and cause the return of the elements to the central part of the expanding head 51 when the elements are released. Each expanding element 53 is provided with a concave surface 63 preferably conical to produce large bearing areas, and a cone-shaped wedge member 66 extends within the cavity formed by the assembled expanding elements 53. The conical member 66 substantially conforms to the frustum of a cone and is provided with surfaces that correspond to the surfaces of the assembled expanding elements whereby, upon downward movement of the conical member 66, the expanding elements will be moved radially outward.

A plate 67 is secured by means of the bolts 68 to the top of the conical member. The base part 56 of the head is provided with a central hollow pedestal 70, and the conical member 66 is centrally bored as at 71. A spring 72 extends through the pedestal and is located intermediate the bottom of the trough, or other part located thereon, and the plate 67. The spring 72 operates to raise the conical member 66 after its depression to spread the expanding elements 53. The upper end of the pedestal may be provided with a suitable shoulder 73 and a key 74 that may be secured in position against the shoulder by a ring 76 bolted by means of the bolts 78 to the pedestal. One side of the bore 71 is provided with a key-way 81 in which the key 74 is located. The key-way 81 terminates near the lower end of the conical member 66, and the key 74 engages the end of the key-way 81 and forms a limiting stop for the outward movement of the conical member 66 by the pressure of the spring 72.

When the conical member 66 is depressed, it operates against the concave surfaces 63 to move the dies 52 outwardly with respect to the axis of the expanding head 51. The outer surfaces of the dies 52 have cylindrical sector surfaces that engage the housing of the axle. In the form of axle illustrated in the drawings, the dies 52 engage the flanges 47 to cylindrically expand the housing. The dies 52 are provided with flange parts 83 on which the housing is supported, and, in advance of chilling the axle, the upper side or part of the housing is engaged by a clamping cap 86 to press the housing against the flange parts 83 of the dies 52. The upper surfaces of the flanges 83 of the dies 52 are located in a definite relation with respect to the dies 8 and 9 of the supporting members 6 and 7 and when the gear housing part has been expanded by the dies 52, it is engaged by the edge of the cap 86 that clamps the housing against the flanges of the dies. The dies 52 and the clamping cap may be operated by a suitable cylinder.

In the particular structure shown, the central part of the cap 86 is adjustably connected to a sleeve 87 by means of the nuts 88. The sleeve 87 is connected to a piston 91 movable in the cylinder 92. The cylinder 92 may be supported by means of the bracket 90, that is bolted to the trough 1. The cylinder 92 is connected to a source of supply of air under pressure by means of suitable pipes, and pressures are controlled by suitable valves to produce reciprocatory movements of the piston and the sleeve 87. The sleeve 87 extends through the piston and the heads of the cylinder 92, and its upper end is connected to a yoke 93. A toggle 96 is connected to the upper end of the yoke 93 by the bolt 97. The toggle is formed of the links 98 and 101. The link 101 is connected to the link 98 by means of the studs 102 that form the joint of the toggle. The link 101 is connected to a block 103 by means of the studs 106. A rod 107 having a threaded portion 108 is connected to the block 103. The rod 107 extends through the sleeve 87 and engages the center part of the plate 67 and is adapted to depress the cone 66 to move the expanding elements 53 and the dies 52 outwardly and cause distension and cylindrical formation of the housing 45. The toggle of the form shown in Fig. 2 has a knife-blade or knee joint. The link 101 has a cross piece 94, while the link 98 has a substantial square corner part 95 on one side and a cylindrically formed corner part 100 on the other side. The cylindrical surface of the part 100 centers in the axis of the joint of the toggle and enables breaking of the toggle in one direction, while the corner part 95 abuts the cross piece 94 and operates to hold the toggle extended when the center of the joint is slightly to one side of the center line between the bolt 97 and the studs 106. The arm 111 affords a means to break the toggle by movement of the link 98 towards the right in the form shown in Fig. 2. The yoke 93 is provided with an adjustable stop screw 104 located in a cross piece 105 that adjustably limits the extent of the break. When the housing of the heated axle has been placed in position on the expanding dies, the piston 91 descends, and the rod 87 engages the plate 67, depresses the cone 66, and causes the dies 52 to expand the housing to the limit determined by the adjustment of the cap 86 with reference to the rod 107 when the cap 86 engages the top of the housing. The gear housing part has thus been expanded to a predetermined extent while hot. The toggle lever is then broken, and the dies 52 are released, as limited by the stop 104, and moved inward, and the cap 86 is clamped against the gear housing part, and the gear housing part against the flanges 83 of the dies. The axle housing is then flooded with the cooling fluid and contracts. The pressures in the cylinders may then be reversed which will release the axle from the dies, and the axle may be removed. The cooling oil may then be withdrawn from the trough and the toggle straightened and a heated axle inserted in position in the trough. Thus, the axle housings may be rapidly heat-treated. The gear housings of the axle will have fixed diametrical dimensions, and the main supporting and bearing parts will have the same aligning relation.

If desired, the knee joint of the toggle shown in Fig. 2 may be omitted, and a relatively lightweight spring 113 may be used, as shown in Fig. 3, to hold the joint in position for the expansion of the housing when hot. The spring, though light in weight, will, by reason of the great mechanical advantage by its toggle engagement, hold the links approximately at the line of centers of the toggle, so that when the piston 91 descends, the housing will be expanded. The arm 111 may then be lowered to break the toggle against the pressure of the spring 113 and reduce its mechanical advantage to a desired extent and enable the clamping of the housing by the cap. The contracting pressure of the cooling metal on the dies, although yieldingly resisted by the spring 113, will eventually move the toggle to the limit set by an adjusting stop screw 121 which determines the finally formed diameter of the housing. The spring exerts sufficient yielding pressure to maintain the dies in yielding but constant engagement with the housing, which prevents distortion of the housing as it is cooled. The link 98 is provided with a lug 116 that enters the lower end of the spring 113 and maintains the spring in its engaging relation with the lower end of the link 98. The upper end of the spring is connected to a threaded sleeve 118, supported in the bracket 117, and the pressure of the spring against the toggle lever may thus be adjusted. The sleeve 118 is also interiorly threaded, and a stop screw 121 is located within the sleeve and consequently is also adjustable with respect to the toggle lever. The stop screw 121 is located in position to be engaged by the lug 116 at a point to which it is desired to limit the inward movement of the dies 52 by the contraction of the gear housing part 45, and consequently operates to limit the contraction of the gear housing part to a definite diameter. Fingers 122 and 123 may be connected to the threaded sleeve 118 and the stop screw 121 for convenient manipulation of the sleeve and the stop screw to produce the desired adjustments.

In the operation of the machine, the axle is heated to a temperature above the critical temperature, in the manner well known in the art, and is immediately placed in position on the dies 8, 9, and 52. The cylinders 28 are thrown into position and the cylinders 16 and 28 are connected with a source of supply of fluid under pressure through suitable valves, whereby the axle is clamped by the dies 8 and 37, and 9 and 26. The parts of the axle and its housing will thus be maintained in a defined relation with respect to the clamped parts of the axle when submerged in a liquid and heat treated. The gear housing part is then expanded to a definite size by the dies 52 which are operated by the toggle mechanism and, preferably, upon submersion in the cooling liquid, they are released for free inward contraction, in the form of construction shown in Fig. 2, or allowed to contract under reducing yielding pressure, as in the form shown in Fig. 3 to a limited extent. The trough 1 is then flooded with a cooling liquid.

The trough 1 may be flooded with a cooling fluid, such as oil, in any well-known manner. In the particular structure shown in the drawings, the trough is provided with a conduit 126 extending along the bottom and substantially the length of the trough. The conduit communicates with the interior of the trough through a plurality of openings 127 that may be located at spaced points in order to introduce and distribute the cooling fluid throughout the trough and enable rapid flooding or submergence of the entire axle at substantially the same instant. The conduit 126 is connected to one or more reservoirs, such as the reservoir 128, by the pipes 131. Suitable valves 132 may be located at the inlets 130 of the conduit 126 for controlling the flow of the fluid from the reservoir 128 to the trough through the pipes 131. Also, the conduit 126 may be provided with the outlets 133, and a pan or other receptacle 134 may be located beneath the outlets 133 to receive oil from the trough upon the completion of the tempering operation. One or more valves 135 may be located in position to close the outlets 133 in advance of opening of the inlets 130 to direct the oil from the reservoir 128 into the trough. The valves 132 may be closed, and the valves 135 may be opened to allow the oil to flow into the receptacle 134 upon the completion of the tempering operation. The oil may be drawn from the pan 134 and directed into the pipes 131 by means of a suitable pump 138, and the reservoir 128 may thus be recharged preparatory to the succeeding tempering operation. The gate valves may be connected to rods 136 and 137 supported in suitable bearing parts and may be operated by rotation of the rods. The rods 136 and 137 may be connected together by the gears 139 and 140 that intermesh and cause oscillatory movements of the valves 132 and 135. If desired, one of the rods, such as the rod 137, may be connected to a pedal lever 141. The pedal lever 141 may be spring-pressed, as by the tension spring 142, to cause the return of the pedal lever when released and after its depression and reverse movement of the valves. The oscillatory movement of the rod 137 produced by the pedal lever 141 will cause the opposite rotative movement of the rod 136 and the opening of the valve 132 when the valve 135 is closed and the closing of the valve 132 when the valve 135 is opened.

I claim:

1. In a tempering machine, a receptacle, means for flooding and withdrawing a cooling fluid from the receptacle, a plurality of movable members located in the receptacle, means for forcing the members radially against the work to expand the members while the work is hot, and means for limiting the extent of return movement of the members to limit the contraction of the parts of the work engaged thereby as the work cools subsequent to the initial contractile movements of the parts.

2. In a tempering machine, a receptacle, means for flooding and withdrawing a cooling fluid from the receptacle, a plurality of members located in the receptacle and movable in different directions for engaging the work, means for forcing the members against the work, and a means for progressively decreasing the resistance to the countermovement of the members produced by the pressure of the work during the chilling of the article.

3. In a metal article shaping machine, a plurality of radially movable members for engaging parts of the article, means for engaging the radially movable members to radially move the members, a clamping member for clamping the said parts, an element connected to the clamping member, a second element supported on and movable relative to the first named element for operating the said means, means for securing the first element relative to the second element at two points in their relative movements for limiting the movement of the second element relative to the first element to produce operation of the movable members to engage and move parts of the work while the metal is hot and for limiting the return movement of the movable members and the parts of the work as the metal cools.

4. In a tempering machine, a receptacle, means for flooding and withdrawing a cooling fluid from the receptacle, a clamping member for clamping the work and located in the receptacle, a plurality of radially movable members, a toggle connected to the clamping member for forcing the radially movable members against the work, and a spring for engaging the joint of the toggle for producing gradually decreasing pressure of the members against the work.

5. In a shaping machine, a plurality of movable members for shaping the work, a clamping member for clamping the work, a sleeve connected to the clamping member, a rod movable within the sleeve for operating the movable members, means for operating the sleeve to cause the said clamping member to exert a clamping action, and means interconnecting the sleeve and the rod for actuating the rod relative to the sleeve.

6. In a shaping machine, a plurality of members movable in different directions for shaping the work, a clamping member for clamping the work, a sleeve connected to the clamping member, a rod movable within the sleeve for operating the said plurality of movable members, means for operating the sleeve to cause the said clamping member to exert a clamping action, a toggle means interconnecting the sleeve and the rod for actuating the rod, and means for adjusting the clamping member relative to the sleeve to adjust the extent of movement of the said plurality of movable members.

7. In a tempering machine, a receptacle, means for flooding and withdrawing a cooling fluid from the receptacle, a plurality of movable members located in the receptacle for shaping the work while the work is hot, a clamping member, a sleeve connected to the clamping member, a rod movable within the sleeve for operating the said plurality of movable members, means for operating the sleeve to cause the said clamping member to exert a clamping action, a toggle means interconnecting the sleeve and the rod for actuating the rod, means for yieldingly resisting countermovement of the said movable member by the work as the work contracts during cooling, and a stop for limiting the movement of the toggle by the countermovement of the said movable members produced by the contraction of the work as it is cooled.

8. In a metal shaping machine, a plurality of movable members for engaging and moving parts of the work while the work is hot, means for forcing the members against the work, means for limiting the extent of movement of the members each in one direction to limit the corresponding movement of the parts of the work while hot and means for limiting the return movement of the said parts of the work during contraction of the work and subsequent to the initial contractile movements of the parts of the work engaged by the members as the work chills.

9. In a metal shaping machine, a plurality of members movable each in different directions for engaging different parts of the work while hot, a resilient means for resisting the movement of the members and the work as the metal chills, and means for limiting said movement to limit the contraction of the work and subsequent to the initial contractile movements of the parts of the work engaged by the members while chilling to form the article.

10. In a metal shaping machine, a plurality of movable members for engaging moving parts of the work while the work is hot, means for forcing the members against the work, means for limiting the extent of movement of the members each in one direction to limit a corresponding movement of the parts of the work while hot, a resilient means for resisting the return movement of the said members as the parts of the work engaged by the members move during contraction of the work as the work chills.

11. In a tempering machine, a plurality of members located in the receptacle and movable in different directions for engaging the work, means for forcing the members against the work, and means for limiting the countermovement of the members produced by the pressure of the work and subsequent to the initial contractile movements of the parts of the work engaged by the members during the chilling of the article.

12. In a metal shaping machine, a plurality of movable members for engaging and moving parts of the work while the work is hot, means for forcing the members against the work, means for limiting the extent of movement of the members each in one direction to limit the corresponding movement of the parts of the work while hot, means for limiting the return movement of the said members upon contraction of the work and subsequent to the initial contractile movements of the parts of the work engaged by the members as the work chills, and a resilient means for resisting the return movement of the said members until the said members engage the said limiting means.

13. In a metal article shaping machine, a plurality of radially movable members for engaging parts of the article, a clamping member, an element for moving the clamping member to clamp the said parts, a second element for moving the radially movable members, and means for limiting the extent of movement of the second named element for limiting the movement of the members while the metal is hot, and means for limiting the return movement of the second named element to limit the return movement of the movable members and the parts of the work subsequent to the initial contractile movements of the parts of the work engaged by the members as the metal cools.

14. In a metal article shaping machine, a plurality of radially movable members for engaging the article, a clamping member, an element for moving the clamping member to clamp the said parts, a second element for moving the radially movable members, means for moving the elements to and from the article for clamping the said parts, means for limiting the extent of the movement of the said second element relative to the first named element for limiting the movement of the members while the metal is hot and means for limiting the return movement of the second named element relative to the first named element to limit the return movement of the movable members and the parts of the work as the metal cools.

15. In a machine for shaping metal articles, a plurality of members, means for movably supporting the members, means for moving the movable members in different directions for engaging the work and forcing the members against the work, and means for progressively decreasing the resistance to the countermovement of the members produced by the pressure of the work during the chilling of the article.

16. In a machine for shaping metal articles, a plurality of members, means for movably supporting the members, means for moving the movable members in different directions for engaging the work and forcing the members against the work, means for progressively decreasing the resistance to the countermovement of the members produced by the pressure of the work during the chilling of the article, and means for positively limiting the return movement of the members during the contractile movements of the parts of the work to maintain a predetermined shape of the work as its temperature decreases subsequent to the engagement of the limiting means.

17. In a machine for shaping metal articles, a clamping member for clamping the work, a plurality of radially movable members, a toggle for forcing the movable members against the work, a spring for engaging the central joint of the toggle for yieldingly resisting the movement of the joint of the toggle to produce gradual decreasing pressure of the members against the work, and a limiting stop for engaging the joint of the toggle for limiting the return movement of the members subsequent to the initial contractile movement of the parts of the work engaged by the members for producing a predetermined shape of the work as the work further cools.

BERTIS H. URSCHEL.